(12) United States Patent
Calkins

(10) Patent No.: US 9,339,994 B2
(45) Date of Patent: May 17, 2016

(54) FOAMED SURFACE COVERING WITH COHERENT LAYER

(71) Applicant: Mark A Calkins, La Mirada, CA (US)

(72) Inventor: Mark A Calkins, La Mirada, CA (US)

(73) Assignee: KITTRICH CORPORATION, Pomona, CA (US)

( * ) Notice: Subject to any disclaimer, the term of this patent is extended or adjusted under 35 U.S.C. 154(b) by 334 days.

(21) Appl. No.: 13/624,813

(22) Filed: Sep. 21, 2012

(65) Prior Publication Data

US 2014/0050878 A1 Feb. 20, 2014

Related U.S. Application Data

(60) Provisional application No. 61/683,655, filed on Aug. 15, 2012.

(51) Int. Cl.
| | |
|---|---|
| *B32B 27/06* | (2006.01) |
| *B32B 3/26* | (2006.01) |
| *B32B 5/02* | (2006.01) |
| *B32B 5/18* | (2006.01) |
| *B32B 5/24* | (2006.01) |
| *B32B 7/06* | (2006.01) |
| *B32B 27/08* | (2006.01) |
| *B32B 27/30* | (2006.01) |
| *B32B 3/30* | (2006.01) |

(52) U.S. Cl.
CPC ............. *B32B 27/065* (2013.01); *B32B 3/263* (2013.01); *B32B 3/30* (2013.01); *B32B 5/028* (2013.01); *B32B 5/18* (2013.01); *B32B 5/245* (2013.01); *B32B 7/06* (2013.01); *B32B 27/08* (2013.01); *B32B 27/302* (2013.01); *B32B 27/308* (2013.01); *B32B 2262/0276* (2013.01); *B32B 2264/104* (2013.01); *B32B 2266/0235* (2013.01); *B32B 2266/0278* (2013.01); *B32B 2270/00* (2013.01); *B32B 2307/726* (2013.01); *B32B 2307/744* (2013.01); *B32B 2471/00* (2013.01); *B32B 2471/04* (2013.01); *Y10T 428/239* (2015.01); *Y10T 428/24504* (2015.01); *Y10T 428/249953* (2015.04)

(58) Field of Classification Search
CPC .... B32B 27/065; B32B 27/08; B32B 27/302; B32B 27/308; B32B 3/263; B32B 3/30; B32B 5/028; B32B 5/18; B32B 5/245; B32B 7/06; B32B 2262/0276; B32B 2264/104; B32B 2266/0235; B32B 2266/0278; B32B 2270/00; B32B 2307/726; B32B 2307/744; B32B 2471/00; B32B 2471/04; Y10T 428/239; Y10T 428/24504; Y10T 428/249953
USPC ........................................ 428/76, 304.4, 159
See application file for complete search history.

(56) References Cited

U.S. PATENT DOCUMENTS 3,945,955 A * 3/1976 Ihde, Jr. ........................... 521/75
4,517,243 A * 5/1985 Sinha et al. .................... 428/336

(Continued)

OTHER PUBLICATIONS

Cray Valley, Product Guide, Jan. 2013.*

*Primary Examiner* — Aaron Austin
*Assistant Examiner* — Michael Zhang
(74) *Attorney, Agent, or Firm* — Leason Ellis LLP

(57) ABSTRACT

Embodiments of a new foamed surface covering are disclosed, wherein a primary layer of polymeric foam features at least one coherent layer consisting of a water-resistant blend of styrene-maleic anhydride and acrylic resin. The coherent layer facilitates the secured and reusable application of the surface covering after repeated washings.

36 Claims, 6 Drawing Sheets

(56) References Cited

U.S. PATENT DOCUMENTS

| | | | |
|---|---|---|---|
| 4,978,566 A * | 12/1990 | Scheurer et al. | 428/157 |
| 5,120,587 A | 6/1992 | McDermott, III et al. | |
| 7,601,653 B2 | 10/2009 | Price | |
| 2002/0145089 A1 | 10/2002 | Calkins | |
| 2004/0018227 A1 * | 1/2004 | Park et al. | 424/445 |
| 2005/0037190 A1 * | 2/2005 | Browne | 428/304.4 |
| 2005/0049341 A1 * | 3/2005 | Grass et al. | 524/306 |
| 2009/0148666 A1 * | 6/2009 | Yeh | 428/159 |

* cited by examiner

FOAMED SURFACE COVERING WITH COHERENT LAYER

This application is a non-provisional application which claims the benefit of priority from U.S. Provisional Application No. 61/683,655, filed on Aug. 15, 2012, the entire contents of which are herein incorporated by reference.

FIELD OF THE INVENTION

The present invention is directed toward removable nonslip foamed surface coverings which are used as rug underlay pads or, alternatively, as shelf, drawer or storage liners. In particular, the covering features an improved composite material having a primary layer of polymeric foam combined to at least one coherent layer consisting of a water-resistant blend of styrene-maleic anhydride and acrylic resin. The structure of the multilayered composite material facilitates the secured and reusable application of the surface covering after repeated washings.

DESCRIPTION OF THE PRIOR ART

Nonslip foamed surface coverings have been extensively sold at retail venues and are commonly utilized as rug underlay materials or as shelf and drawer liners. One type of nonslip covering consists of a knitted polyester scrim featuring a coating of thermally foamed polyvinyl chloride (PVC) resin. The knitted construction of the scrim provides an arrangement of woven yarns defining a pattern of apertures that correspond to a configuration of openings extending through the thickness of the cured PVC material. Alternatively, the PVC resin may be knife coated to either side of a knitted scrim devoid of openings, or to a non-woven fabric of autogenously bonded fibers, producing a continuous layer of supported foam. The PVC compound also includes a plasticizer that imparts a removable nonslip mechanical bond between the foamed covering and an applied surface. Although thermally foamed nonslip coverings provide a layer of cushioning and surface protection, such unanchored materials require frequent repositioning because they are prone to bunch up or shift through repetitive use.

Another problem with thermally foamed PVC coverings relates to the migration of monomeric and polymeric plasticizers that have been known to cause marring of certain types of underlying surfaces. Such vulnerable surfaces include lacquered or oil-based painted finishes, along with composite wood shelving and furnishings embellished with dry thermal transfer appliqués, which simulate decorative wood grained facings and are made from acrylic or nitrocellulose resins. Plasticizers within foamed PVC compounds may also react negatively with vinyl flooring and wood laminates coated with polyurethane varnishes. In addition, the application of plasticizers within foamed PVC coverings—although useful in providing nonslip properties to such materials—are also known to adversely affect the performance of anchor coatings that are formulated from conventional acrylic and rubber based adhesives.

The primary disadvantage of the prior art, inherent within foamed PVC coverings that feature self-adhesive anchor coatings, concerns the inadvertent disintegration of the material upon removal. For example, U.S. Pat. No. 5,120,587, issued on Jun. 9, 1992 to L. McDermott, III et al., discloses a support binder for carpeting in the form of a scrim having a plurality of alternating spaced frame elements sheathed within a thermally foamed coating of polymeric resin. The foamed binder includes corresponding layers of adhesive to secure carpets and area rugs onto floors or other carpeting. Over time, the cellular structure of the polymeric foam degrades with age, while the self-adhesive anchor coating becomes fully cured to a selected surface. Consequently, replacement of the self-adhesive covering will result in the residual adhesion of miniscule fragments of foam to the underside of carpeting and to subjacent flooring surfaces.

One remedy in the prior art includes the application of an intermediate layer of polymeric film to act as a mechanical barrier between the polymeric foam and the underlying coating of adhesive. The polymeric film provides an increased surface area to enhance the adhesion of the PVC covering and prevents the transfer of residual foam to flooring or to the interiors of cabinets and drawers. For instance, U.S. Pat. No. 7,601,653, issued on Oct. 13, 2009 to S. Price, discloses an adhesive grip liner comprising a foam sheet material which is joined to a layer of vinyl film. The underside of the vinyl is coated with a continuous or imprinted layer of adhesive. Similarly, U.S. Patent Application Publication US 2002/0145089 A1 by M. Calkins, published on Oct. 10, 2002, discloses a protective covering sheet having a scrim-supported foamed PVC working surface, which is adhered to a layer of polymeric film. As in the previous related example, a pressure sensitive adhesive is applied to the reverse face of the polymeric film. In both embodiments, a removable release liner serves as a protective masking to the layer of adhesive. Although the use of release liners enable the efficient packaging of self-adhesive foamed surface coverings, the dissimilar thicknesses of the component layers that make up such materials create an unbalanced laminated construction, thereby causing the inadvertent wrinkling of the finished goods when they are wound into rolls for retail distribution.

The systems, methods, and inventions described in the above-identified patent publications are found lacking in disclosing an improved reusable surface covering material, which is comprised of a layer of polymeric foam combined to a water-resistant layer of coherent resin.

Accordingly, it is a principal object of the present invention to provide an improved multilayered composite material for use as rug underlay pads, or shelf and storage liners, having a resilient layer of polymeric foam combined to an anchor coating of coherent resin that facilitates the secured and reusable application of the surface covering after repeated washings.

It is a further object of the present invention to provide a multilayered composite material having a layer of thermally cured polymeric foam encasing an intermediate reinforcing layer of knitted or nonwoven scrim.

It is an alternate object of the present invention to provide a multilayered composite material having a continuous layer of thermally cured unsupported polymeric foam.

It is another object of the present invention to provide a multilayered composite material having at least one coherent layer composed of a water-resistant blend of styrene-maleic anhydride and acrylic resin.

It is yet another object of the present invention to provide a multilayered composite material having a coherent layer of a styrene-maleic anhydride and acrylic resin that impedes the migration of monomeric and polymeric plasticizers.

It is an additional object of the present invention to provide a multilayered composite material that does not require an integral release coating or separable release liner to protect the layer of coherent resin.

Finally, an object of the present invention is to provide a multilayered composite material having a coherent anchor coating that prevents the adhesion of residual polymeric foam to subjacent surfaces upon removal.

SUMMARY OF THE INVENTION

The disadvantages and limitations of the background art discussed above are overcome by the present invention. With this invention, a removable nonslip foamed surface covering is provided, wherein an improved multilayered composite material, having at least one layer of resilient polymeric foam, is combined to at least one layer of a coherent blend of styrene-maleic anhydride and acrylic resin. In a preferred embodiment, the polymeric foam is an expanded polyvinyl chloride (PVC) resin that is thermally cured to a knitted or nonwoven reinforcing scrim. Alternatively, The PVC layer may also consist of a continuous unsupported sheet of polymeric foam. The structure of the multilayered composite material facilitates the secured and reusable application of the covering, even after repeated washings, to a broader range of horizontal and vertical surfaces.

In accordance with the present invention, the primary layer of expanded foam consists of a polymeric compound that includes: a plasticizer; polyvinyl chloride resins; calcium carbonate; a chemical foaming agent; a heat stabilizer; and a pigment. In a preferred embodiment, the plasticizer may be selected from the group of Diisononyl phthalates (DINP), Dioctyl terephthalates (DOTP), Epoxidized Soybean Oils (ESO), or mixtures thereof. The compound is further comprised of a copolymeric blend of two dissimilar PVC homopolymer dispersion resins which respectively exhibit low and medium viscosities. A calcium carbonate powder is additionally used as filler within the polymeric formulation. The PVC copolymeric admixture also contains a chemical blowing agent that is selected from the group of hydrazine derivatives, and is more particularly an Azodicarbonamide powder that is suspended in the resin formulation. Under thermal decomposition, Azodicarbonamide releases nitrogen when exposed to temperatures in the range of 200° to 215° C., thereby causing the expansion of the polymeric composition. To impede the heat-induced deterioration of the compound during processing, Zinc Octoate is used as a stabilizing additive to lower the thermal activation range of the Azodicarbonamide powder. Finally, the PVC foam may be colored with a pigment system that is compatible with the selection of plasticizers used within the polymeric formulation.

The primary layer of expanded PVC foam may comprise a thermally cured formulation that is reinforced with an intermediate layer of knitted or nonwoven scrim. The polymeric suspension may be applied by way of dip coating the reinforcing substrate or, optionally, through a transfer roll coating method in which the compound is meted out from an underlying reservoir. The coated material is then conveyed through an oven to activate the blowing agent and to solidify the composition. Alternatively, the polymeric formulation may be cured by means of a thermal calendering process, wherein the polyvinyl chloride admixture is uniformly coated on a releasable belt or casting paper which is compressed against a heated roller. In the absence of a knitted scrim or non-woven substrate, the releasable belt or casting paper provides support and dimensional stability to the unsupported polymeric compound while maintaining the uniform thickness of the nonslip material during solidification.

The present invention features at least one coherent layer consisting of a water-resistant blend of Styrene-Maleic Anhydride (SMAnh) copolymer and Acrylic resin. SMAnh is a synthetic copolymer that is composed of almost perfectly alternating Styrene (STY) and Maleic Anhydride (MAnh) monomers. The main characteristics of SMAnh, which is achieved through the controlled radical polymerization of STY and MAnh monomers, includes its transparent appearance, high heat resistance, superior dimensional stability, and the specific reactivity of the anhydride groups. Styrene-Maleic Anhydride is also soluble in water-based alkaline solutions and dispersions, and the specific reactivity of the copolymer makes it a suitable agent for compatibilizing normally incompatible polymers. Accordingly, the dispersion of SMAnh copolymer, blended in combination with the suspension of Acrylic resin, functions as an essential crosslinking agent between the coherent anchor coating and the primary layer of PVC foam.

Further objects and advantages of the present invention will be apparent from the following description of the preferred embodiments when considered in conjunction with the accompanying drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
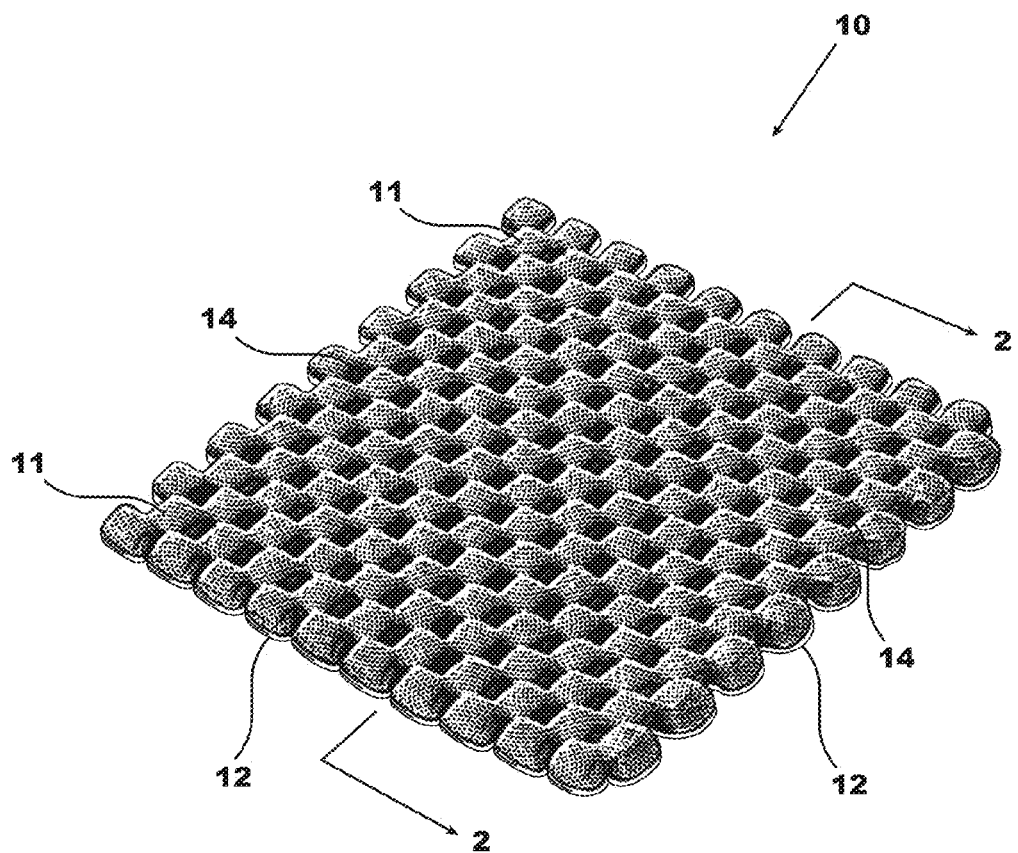
FIG. 1 is a perspective view of a multilayered composite material according to the present invention, showing a primary layer of polymeric foam combined to a coherent layer of a water-resistant blend of styrene-maleic anhydride and acrylic resin.

The present invention is a multilayered composite material suitable for use as a rug underlay pad or, alternatively, as a shelf, drawer or storage liner, and generally designated as 10 in the drawings. With reference to FIG. 1, the composite material 10 is a surface covering having a primary layer of resilient polymeric foam 11 combined to at least one layer 12 of a coherent water-resistant blend of styrene-maleic anhydride and acrylic resin. The structure of the multilayered composite material 10 facilitates the secured and reusable application of the surface covering after repeated washings.

Figure 2:
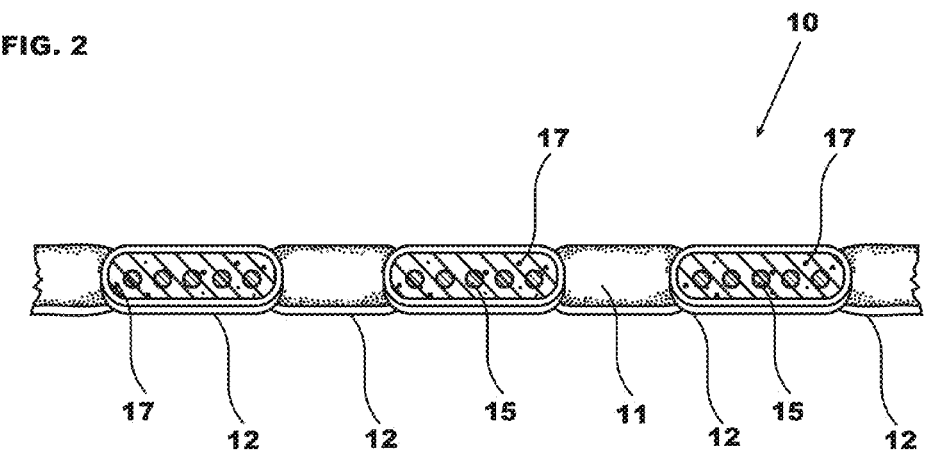
FIG. 2 is a cross-sectional view drawn from lines 2-2 of FIG. 1, showing the layered construction of a multilayered composite material according to the present invention.
Figure 3:
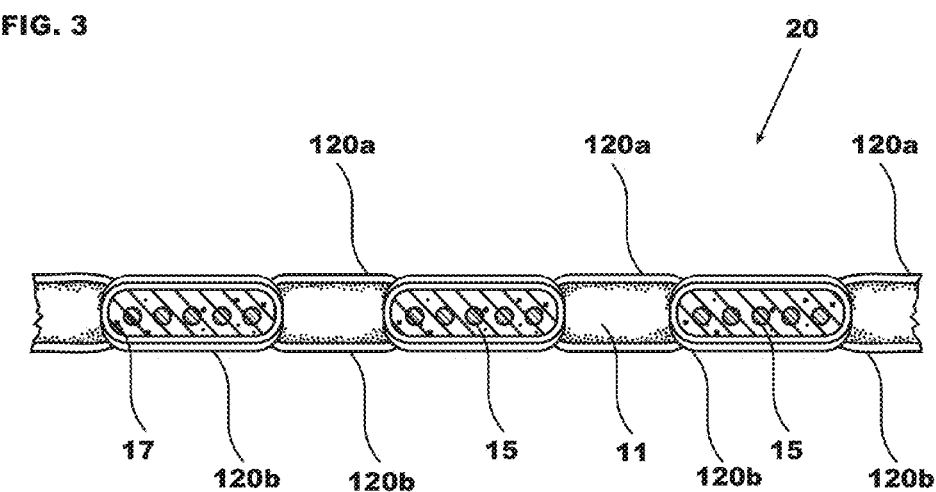
FIG. 3 is a cross-sectional view similar to FIG. 2 showing the layered construction of a first alternate embodiment of a multilayered composite material according to the present invention.
Figure 4:
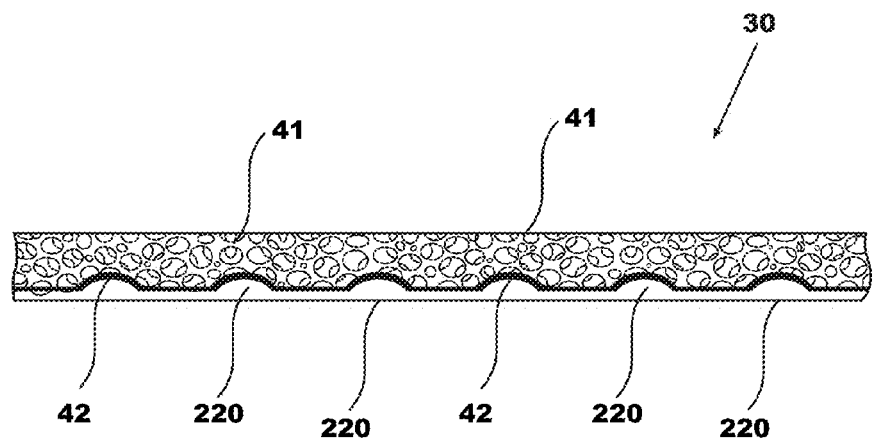
FIG. 4 is a cross-sectional view similar to FIG. 2 showing the layered construction of a second alternate embodiment of a multilayered composite material according to the present invention.

As detailed in FIGS. 2-4, the primary layer 11 or 41 consists of an expanded polymeric foam 17, which is in the range of 1.275 mm to 6.35 mm in thickness, having appreciable and conjoint viscous and elastic properties when deformed. In a preferred embodiment, and as detailed by way of example in Table 1, the expanded polymeric foam is composed of a thermally cured polyvinyl chloride (PVC) compound that includes: a plasticizer; polyvinyl chloride resins; calcium carbonate; a chemical foaming agent; a heat stabilizer; and a pigment. The plasticizer may be selected from the group of Diisononyl phthalates (DINP), Dioctyl terephthalates (DOTP), Epoxidized Soybean Oils (ESO), or mixtures thereof, although other plasticizers may be used. The compound is further comprised of a copolymeric blend of two dissimilar PVC homopolymer dispersion resins which respectively exhibit low and medium viscosities. A calcium carbonate powder is additionally used as filler within the polymeric formulation. The PVC copolymeric admixture also incorporates a chemical blowing agent that is selected from the group of hydrazine derivatives, and is more particularly an Azodicarbonamide powder that is suspended in the resin formulation. Alternatively, the primary layer 11 or 41 may also be composed of other natural or synthetic resins that include Latex; Polyurethane (PUR); Ethylene Vinyl Acetate (EVA); or other appropriate polymeric compounds. It can be recognized that the polymeric formula may also contain additives that are standard in the art, including matting agents, ultra violet inhibitors, flame-retardants, biocides, fungicides, and other ingredients.

TABLE 1

| Compound Ingredient | Parts by weight |
| --- | --- |
| DOTP Plasticizer | 44.72% ± 5% |
| PVC Resin A | 23.96% ± 5% |
| PVC Resin B | 7.99% ± 5% |
| Calcium Carbonate (CaCo3) | 20.76% ± 5% |
| Azodicarbonamide | 1.28% ± 5% |
| Zinc Octoate | 0.64% ± 5% |
| Pigment | 0.66% ± 5% |

Figure 5:
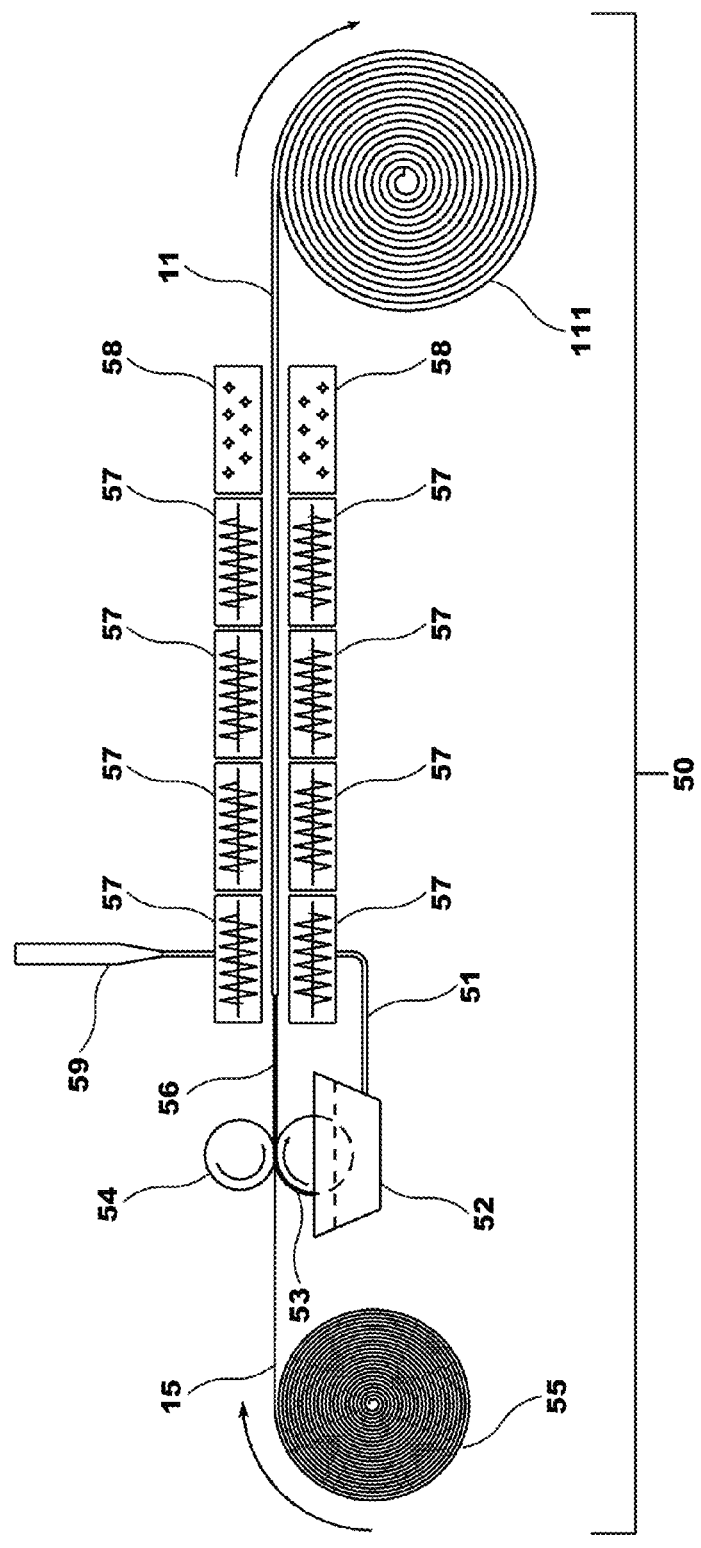
FIG. 5 is a schematic diagram of an apparatus for making the scrim supported foamed layer of a multilayered composite material according to the present invention.

With further reference to FIGS. 2 and 3, the primary layer of expanded PVC foam 11 may comprise a thermally cured polymeric formulation that is reinforced with an intermediate layer of knitted scrim 15 that may also define a series of apertures 14. Alternatively, the intermediate reinforcing layer may consist of a nonwoven substrate that is comprised of autogenously bonded polyester fibers (not shown). In a preferred method, the primary layer of supported foam 11 can be made according to the process schematically depicted in FIG. 5. The intermediate layer of reinforcing scrim 15 is supplied in roll form 55, and transported under controlled tension to a transfer roll coating unit 50, wherein the polymeric admixture is uniformly coated on the supportive material. The polymeric compound is dispensed by metering vat 59 by means of a supply hose 51, to a coating tray 52, in which the transfer roller 53 is suspended. To achieve the uniform application of the uncured compound, the transfer roller 53 delivers the polymeric dispersion to the underside of reinforcing scrim 15, where the coated material is simultaneously compressed against a pressure roller 54. The coated material 56 is then conveyed through a series of ovens 57 where the material undergoes thermal expansion and solidification. To avoid the thermal deformation of the resultant polymeric foam structure, the solidified material is passed through a cooling chamber 58 to lower the temperature of the primary layer 11 before it is collected on take up roll 111.

Figure 6:
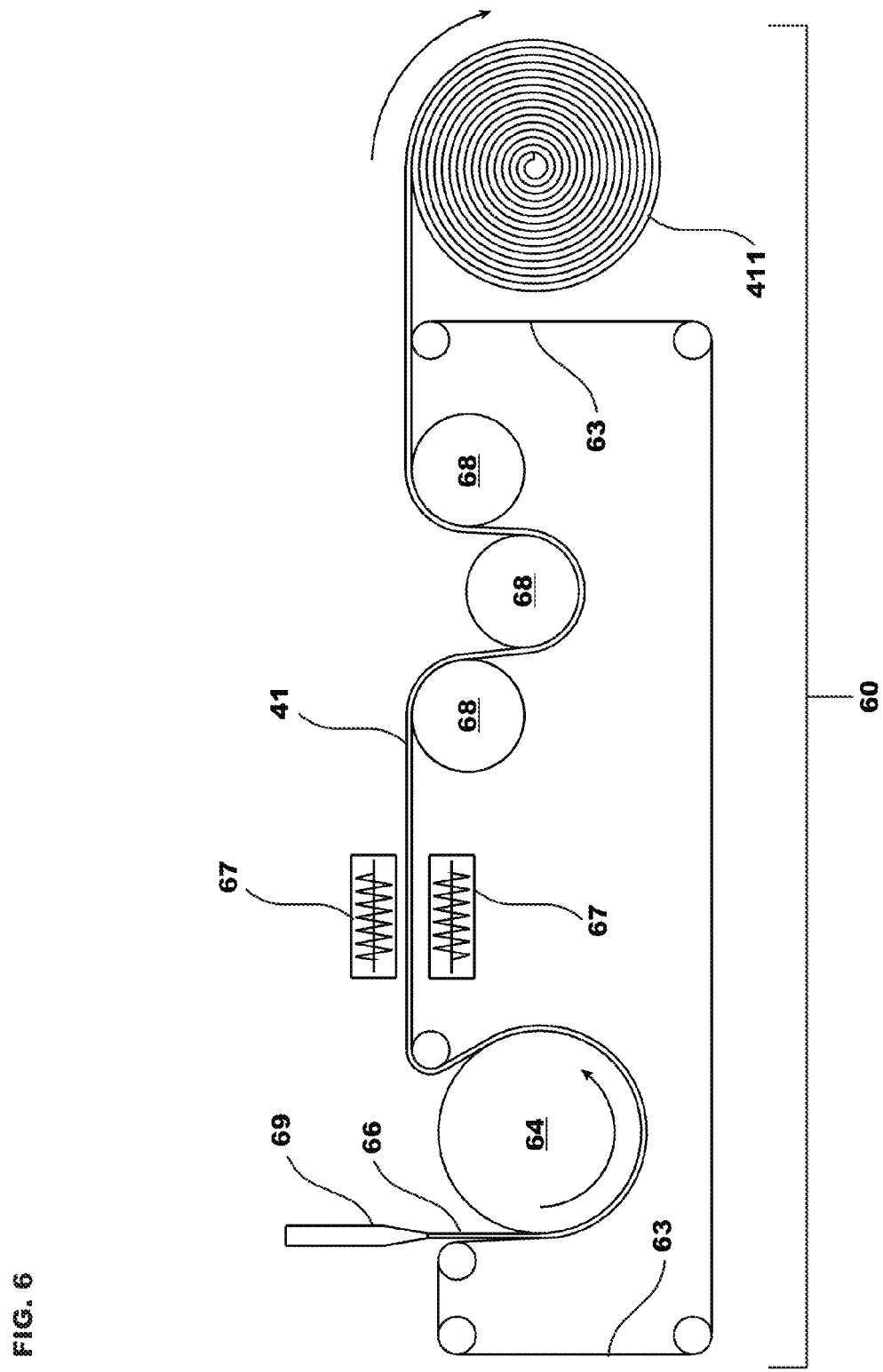
FIG. 6 is a schematic diagram of an apparatus for making a calendered unsupported foamed layer of a multilayered composite material according to the present invention.

Turning once again to FIG. 4, the composite material 30 may alternatively consist of an unsupported primary layer of polymeric foam 41. The primary layer of unsupported foam 41 can be made according to the method that is schematically illustrated in FIG. 6. The polyvinyl chloride compound 66 is cured by means of a thermal calendering process 60, wherein the polymeric admixture is supplied by a metering vat 69 and uniformly coated on a releasable belt 63. The PVC compound 66 and releasable belt 63 are then compressed under tension against a heated roller 64. As an alternative, a releasable paper (not shown) may also be used. In the absence of a knitted scrim or non-woven fabric, the releasable belt 63 or casting paper functions as a carrier for the uncured polymeric compound 66. The carrier maintains the uniform thickness of the foam material 41 during thermal solidification. In an alternate embodiment, the layer of unsupported polyvinyl chloride foam 41 is in the range of 1.275 mm to 1.675 mm in thickness. The primary layer of the PVC foam 41 may be partially solidified as the material exits the heated roller 64, and may be further cured through the use of heated ovens 67. The solidified layer of polyvinyl chloride foam 41 is then cooled through contact with cooling rollers 68, and collected on a take-up roll 411. The uniform layer of cured PVC foam may be smooth on both sides. In a preferred embodiment, the heated roller 64, releasable belt 63 or casting paper is configured to impart a fine pattern of micro-embossed indentations 42. The pattern of micro-embossed indentations 42 are alternately spaced at 0.889 mm intervals, although other micro-embossed configurations may also be used. The micro-embossed indentations 42 essentially provide concaved recesses to enhance the bonding characteristics of the coherent layer 220 to the unsupported layer of polymeric foam 41.

As further illustrated in FIGS. 2-4, the coherent layer 12, 120a, 120b, or 220 is between 0.5 mm to 1.5 mm in thickness, and comprises a water-resistant Styrene-Maleic Anhydride (SMAnh) copolymer, having a glass transition ($T_g$) temperature in the range of −30° to −40° C., which is blended with an Acrylic resin. SMAnh is a synthetic polymer that is composed of Styrene (STY) and Maleic Anhydride (MAnh) monomers. The copolymer is formed by means of radical polymerization, using organic peroxide as the initiator, although SMAnh copolymerization may be carried out via Nitroxide Mediated Polymerization (NMP), which makes use of an Alkoxyamine initiator. Alternatively, and as a preferred embodiment, SMAnh copolymerization may be attained through Reversible Addition-Fragmentation Chain Transfer (RAFT) mediated polymerization, which uses radical initiators such as Azobisisobutyronitrile (AIBN) or 4,4'-Azobis(4-cyanovaleric acid) (ACVA). RAFT polymerization is known for its compatibility with a wide range of monomers as compared to other controlled radical polymerizations. Some monomers capable of polymerizing by RAFT include styrenes, acrylates, acrylamides, and vinyl monomers. As specified by way of example in Table 2, the uncured coating is composed of: Water (H2O); Acrylic Resin; Styrene (STY); Maleic Anhydride (MAnh); and additives. The additives contained within the blend of SMAnh and Acrylic Resin may also include ultra violet inhibitors, biocides, and fungicides, along with other ingredients. It can be further appreciated that the peel strength of the coherent layer of SMAnh and Acrylic resin should not exceed the tensile strength of the foamed cellular structure of the primary layer. The dispersion of SMAnh copolymer, blended in combination with the suspension of Acrylic resin, not only functions as an essential crosslinking agent between the coherent anchor coating and the primary layer of PVC foam, but impedes the migration of monomeric and polymeric plasticizers present within the multilayered composite material.

TABLE 2

| Compound Ingredient | Parts by weight |
|---|---|
| Water (H2O) | 46% ± 5% |
| Acrylic Resin | 40% ± 5% |
| Styrene (STY) | 8% ± 5% |
| Maleic Anhydride (MAnh) | 4% ± 5% |
| Additives | 2% ± 5% |

Figure 7:
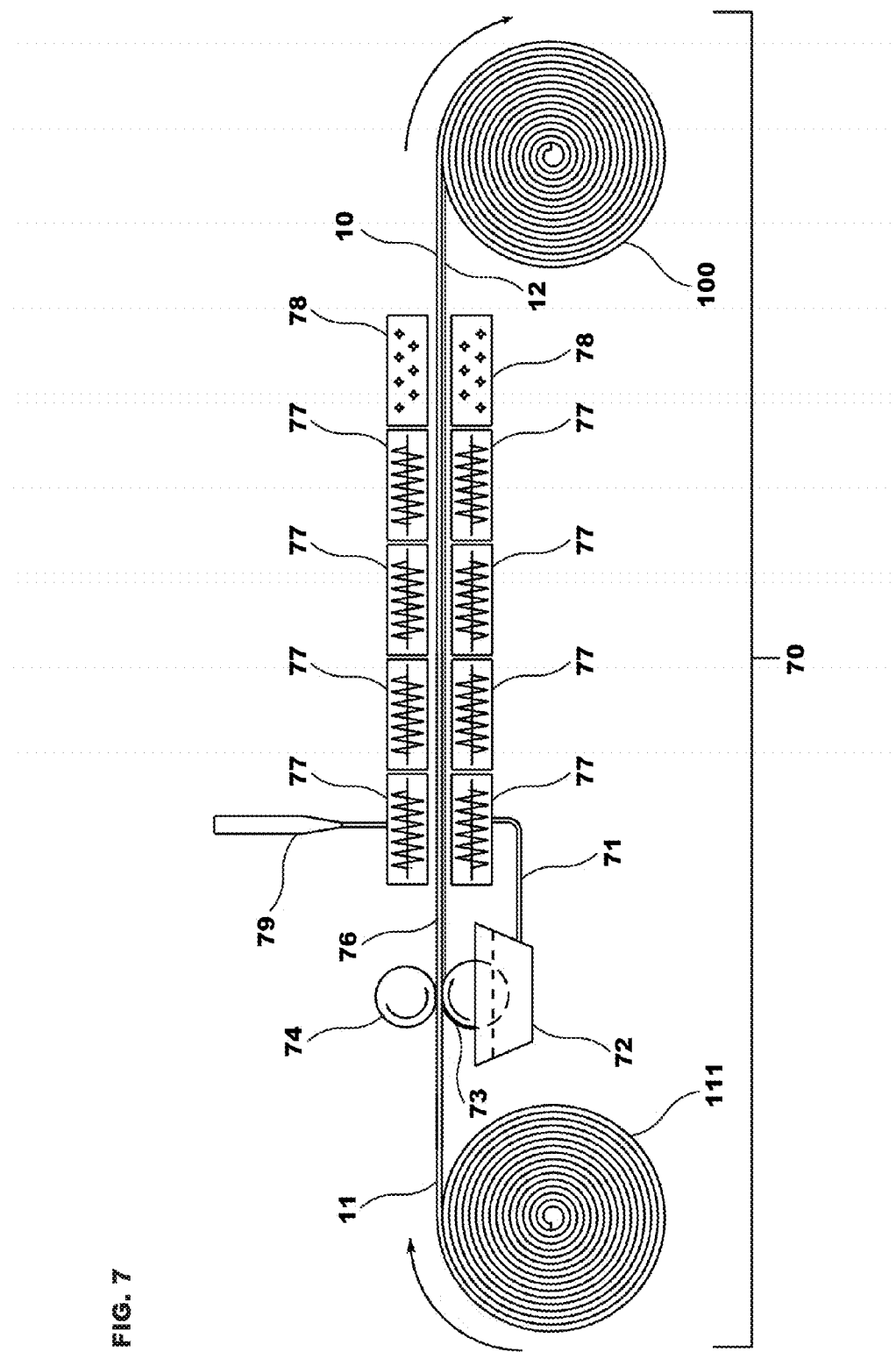
FIG. 7 is a schematic diagram of an apparatus for applying the coherent layer of styrene-maleic anhydride and acrylic resin of a multilayered composite material according to the present invention.

In a similar technique used to produce the primary layer of polymeric foam 11, the coherent layer 12, 120a, 120b, or 220 can be applied according to the method schematically illustrated in FIG. 7. The primary layer of polymeric foam 11 or 41, is supplied in roll form 111 or 411, and transported under controlled tension to a transfer roll coating unit 70, wherein the blend of styrene-maleic anhydride and acrylic resin is uniformly or discontinuously coated on the surface covering material. The blend of coherent resin is dispensed by metering vat 79 by means of a supply hose 71, to a coating tray 72, in which the transfer roller 73 is suspended. To achieve the uniform application of the uncured resin, the transfer roller 73 delivers the dispersion of SMAnh and Acrylic resin 12 to the underside of the primary layer of foam 11 or 41, where the coated material is simultaneously compressed against a pressure roller 74. The coated material 76 is then conveyed through a series of ovens 77, where the material is thermally cured at a temperature in the range of 87° to 93° C. To avoid thermal degradation of the polymeric foam, it is imperative that the process for thermally curing the coherent blend of SMAnh and Acrylic resin be less than 10° C. of the initial softening point of the PVC foam, which is 148° C. To further avoid thermal deformation of the coated foam structure, the material is passed through a cooling chamber 78 to lower the temperature of the composite material 10, 20 or 30 before it is collected on take up roll 100. In addition to the foregoing process, the coherent formulation of SMAnh and Acrylic resin may be applied to the primary layer of polymeric foam via rotary or flatbed screen printing without departing from the scope of the invention.

Figure 8:
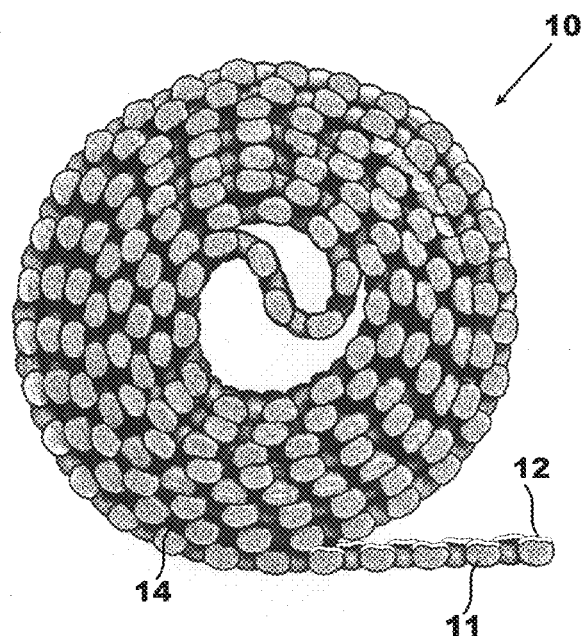
FIG. 8 is an end view of a multilayered composite material in rolled-up form according to the present invention.
Figure 9:
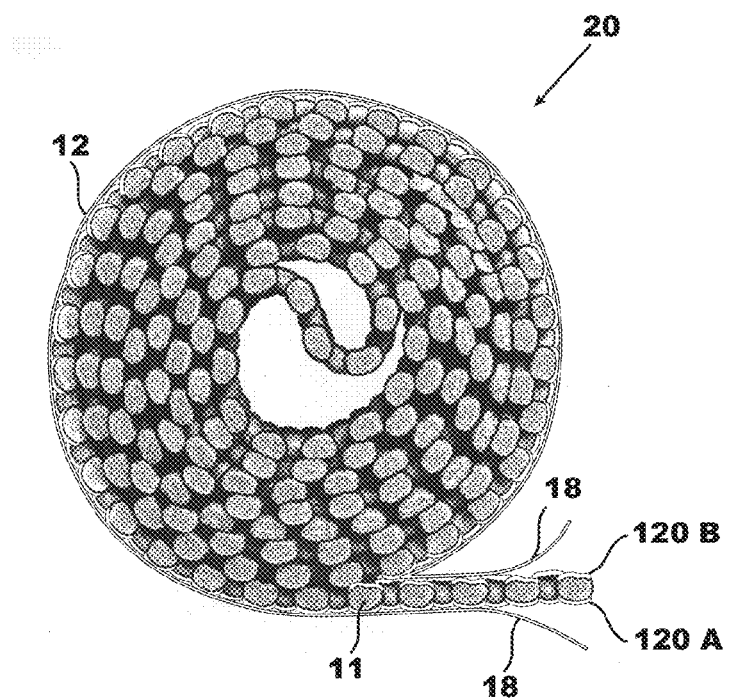
FIG. 9 is an end view of a third alternate embodiment of a multilayered composite material in rolled-up form according to the present invention.

In a preferred embodiment, and as shown in FIGS. 2, 4, and 8, the inherent property of the coherent layer to cling—verses adhere—to an applied surface eliminates the need for an integral release coating, or a separable release liner, thereby facilitating the capacity for the foamed surface covering to be rolled upon itself. The moderate peel strength of the coherent layer additionally prevents the adhesion of residual polymeric foam to subjacent surfaces upon removal. As further illustrated in FIGS. 3 and 9, the foamed surface covering may also feature two coherent layers of SMAnh and Acrylic resin, 120a and 120b, which allows the coated material to function as an intermediate anchor covering in a variety of applications. Moreover, the coherent layers 120a and 120b may vary in degrees of bond strength, thereby requiring the optional use of separable release liners 18. Finally, the hydrophobic property of the blended Styrene-maleic Anhydride and Acrylic resin allows the restoration of the coherent feature of the multilayered composite material after repeated washings.

Even though numerous characteristics and advantages of the present invention have been set forth in the foregoing description, together with details of the structure and function of the preferred embodiments, the above disclosure is illustrative only. Changes may be made in detail, especially in matters of shape, size and arrangement of parts within the principles of the invention to the full extent indicated by the broad general meaning of the terms in which the appended claims are expressed.

The invention claimed is:

1. A surface covering for horizontal and vertical surfaces, comprising:
   a multilayered composite material comprising: (a) a primary layer of polymeric foam; and (b) at least one layer of coherent resin, wherein the at least one layer of coherent resin includes a water-resistant composition of styrene-maleic anhydride copolymer having a glass transition temperature in the range of −30° C. to −40° C. and acrylic resin, whereby the surface covering can be secured and reapplied to horizontal and vertical surfaces after repeated washings.

2. The surface covering according to claim 1, wherein the primary layer of polymeric foam further includes a polymeric compound containing a resin selected from the group consisting of latex, polyvinyl chloride, polyurethane and ethylene vinyl acetate.

3. The surface covering according to claim 1, wherein the primary layer of polymeric foam is composed of a thermally cured polyvinyl chloride (PVC) compound, the compound further comprising a plasticizer, polyvinyl chloride resins, calcium carbonate, a chemical foaming agent, a heat stabilizer, and a pigment.

4. The compound according to claim 3, wherein the plasticizer is selected from the group consisting of Diisononyl phthalates (DINP), Dioctyl terephthalates (DOTP), Epoxidized Soybean Oils (ESO), or combinations thereof.

5. The compound according to claim 3, further comprising a copolymeric blend of two dissimilar PVC homopolymer dispersion resins.

6. The surface covering according to claim 1, wherein the primary layer is between 1.275 mm to 6.35 mm in thickness.

7. The surface covering according to claim 1, wherein the primary layer of polymeric foam encases an intermediate reinforcing layer of knitted or nonwoven scrim.

8. The surface covering according to claim 7, wherein the knitted scrim comprises woven yarns selected from the group consisting of natural or synthetic yarns.

9. The surface covering according to claim 8, wherein the woven construction of the knitted scrim defines a series of apertures.

10. The surface covering according to claim 7, wherein the nonwoven scrim comprises autogenously bonded polyester fibers.

11. The surface covering according to claim 1, wherein the primary layer consists of a continuous layer of unsupported polymeric foam.

12. The surface covering according to claim 11, wherein the continuous layer of unsupported foam includes at least one surface having a plurality of micro-embossed indentations.

13. The surface covering according to claim 12, wherein the micro-embossed indentations provide an arrangement of concave recesses to enhance the bonding characteristics of the coherent layer.

14. The surface covering according to claim 1, wherein at least one layer of coherent resin is between 0.5 mm to 1.5 mm in thickness.

15. The surface covering according to claim 1, wherein the Styrene-Maleic Anhydride copolymer is formed by means of controlled radical polymerization.

16. The surface covering according to claim 1, wherein the coherent layer of Styrene-Maleic Anhydride copolymer and Acrylic resin impedes the migration of plasticizers.

17. The surface covering according to claim 1, wherein the coherent layer of Styrene- Maleic Anhydride copolymer and Acrylic resin prevents the adhesion of residual polymeric foam to subjacent surfaces upon removal.

18. The surface covering according to claim 1, wherein the multilayered composite material does not require an integral release coating to protect the layer of coherent resin.

19. The surface covering according to claim 1, wherein the multilayered composite material does not require a separable release liner to protect the layer of coherent resin.

20. A surface covering for horizontal and vertical surfaces, comprising:
a multilayered composite material comprising: (a) a primary layer of polymeric foam; (b) an obverse layer of coherent resin; (c) a subjacent layer of coherent resin; and (d) at least one separable release liner, wherein at least one layer of coherent resin includes a water-resistant composition of styrene-maleic anhydride copolymer having a glass transition temperature in the range of −30° C. to −40° C. and acrylic resin, whereby the surface covering can be secured and reapplied to horizontal and vertical surfaces after repeated washings.

21. The surface covering according to claim 20, wherein the primary layer of polymeric foam further includes a polymeric compound containing a resin selected from the group consisting of latex, polyvinyl chloride, polyurethane and ethylene vinyl acetate.

22. The surface covering according to claim 20, wherein the primary layer of polymeric foam is composed of a thermally cured polyvinyl chloride (PVC) compound, the compound further comprising a plasticizer, polyvinyl chloride resins, calcium carbonate, a chemical foaming agent, a heat stabilizer, and a pigment.

23. The compound according to claim 22, wherein the plasticizer is selected from the group consisting of Diisononyl phthalates (DINP), Dioctyl terephthalates (DOTP), Epoxidized Soybean Oils (ESO), or combinations thereof.

24. The compound according to claim 22, further comprising a copolymeric blend of two dissimilar PVC homopolymer dispersion resins.

25. The surface covering according to claim 20, wherein the primary layer is between 1.275 mm to 6.35 mm in thickness.

26. The surface covering according to claim 20, wherein the primary layer of polymeric foam encases an intermediate reinforcing layer of knitted or nonwoven scrim.

27. The surface covering according to claim 26, wherein the knitted scrim comprises woven yarns selected from the group consisting of natural or synthetic yarns.

28. The surface covering according to claim 27, wherein the woven construction of the knitted scrim defines a series of apertures.

29. The surface covering according to claim 26, wherein the nonwoven scrim comprises autogenously bonded polyester fibers.

30. The surface covering according to claim 20, wherein the primary layer consists of a continuous layer of unsupported polymeric foam.

31. The surface covering according to claim 30, wherein the continuous layer of unsupported foam includes at least one surface having a plurality of micro-embossed indentations.

32. The surface covering according to claim 31, wherein the micro-embossed indentations provide an arrangement of concave recesses to enhance the bonding characteristics of the coherent layer.

33. The surface covering according to claim 20, wherein at least one layer of coherent resin is between 0.5 mm to 1.5 mm in thickness.

34. The surface covering according to claim 20, wherein the Styrene-Maleic Anhydride copolymer is formed by means of controlled radical polymerization.

35. The surface covering according to claim 20, wherein the coherent layer of Styrene- Maleic Anhydride copolymer and Acrylic resin impedes the migration of plasticizers.

36. The surface covering according to claim 20, wherein at least one coherent layer of Styrene-Maleic Anhydride copolymer and Acrylic resin prevents the adhesion of residual polymeric foam to subjacent surfaces upon removal.

* * * * *